(12) United States Patent
Junkar et al.

(10) Patent No.: US 9,247,384 B2
(45) Date of Patent: *Jan. 26, 2016

(54) GEOFENCING TECHNIQUES

(71) Applicant: Intel Corporation, Santa Clara, CA (US)

(72) Inventors: Martin Junkar, Santa Clara, CA (US); Jun Su, San Jose, CA (US); Minnie Ho, Los Altos, CA (US); Ke Ding, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/976,237

(22) PCT Filed: Dec. 28, 2012

(86) PCT No.: PCT/CN2012/087817
§ 371 (c)(1),
(2) Date: Jun. 26, 2013

(87) PCT Pub. No.: WO2014/101091
PCT Pub. Date: Jul. 3, 2014

(65) Prior Publication Data
US 2015/0045064 A1 Feb. 12, 2015

(51) Int. Cl.
*H04W 4/02* (2009.01)
*H04W 64/00* (2009.01)
*H04L 29/08* (2006.01)
(Continued)

(52) U.S. Cl.
CPC .............. *H04W 4/021* (2013.01); *H04W 4/023* (2013.01); *H04W 64/00* (2013.01); *G06Q 10/0833* (2013.01); *H04L 67/18* (2013.01); *H04M 1/72572* (2013.01)

(58) Field of Classification Search
CPC ....... H04W 4/021; H04W 4/027; H04W 4/26; H04W 4/23; H04W 64/00; H04L 67/18; G06Q 10/0833; G06Q 30/0261; G06Q 30/0267; H04M 1/72572
See application file for complete search history.

(56) References Cited

U.S. PATENT DOCUMENTS

| | | |
|---|---|---|
| 7,339,446 B2 | 3/2008 | Su et al. |
| 7,672,387 B2 | 3/2010 | Lin et al. |
| 8,068,554 B2 | 11/2011 | Lin et al. |

(Continued)

FOREIGN PATENT DOCUMENTS

CN 102027792 A 4/2011

OTHER PUBLICATIONS

International Search Report and Written Opinion received for PCT Application No. PCT/CN2012/087817, mailed on Sep. 19, 2013, 11 pages.

(Continued)

*Primary Examiner* — Nizar Sivji
(74) *Attorney, Agent, or Firm* — Alpine Technology Law Group LLC

(57) ABSTRACT

In one embodiment a controller comprises logic configured to receive, in the controller, a geofencing definition and input from at least one location information device, update a location of the controller using one or more location parameters from one or more location information devices, and generate a notification signal when the location of the controller indicates that the controller has crossed a threshold. Other embodiments may be described.

18 Claims, 5 Drawing Sheets

(51) Int. Cl.
*H04M 1/725* (2006.01)
*G06Q 10/08* (2012.01)

(56) References Cited

U.S. PATENT DOCUMENTS

| | | | |
|---|---|---|---|
| 8,412,154 B1* | 4/2013 | Leemet et al. | 455/406 |
| 8,665,981 B2 | 3/2014 | Lin et al. | |
| 8,934,567 B2 | 1/2015 | Lin et al. | |
| 9,083,403 B2 | 7/2015 | Lin et al. | |
| 2011/0063138 A1 | 3/2011 | Berkobin et al. | |
| 2011/0074587 A1* | 3/2011 | Hamm et al. | 340/584 |
| 2011/0148634 A1 | 6/2011 | Putz | |
| 2013/0045760 A1* | 2/2013 | Obermeyer et al. | 455/456.6 |
| 2013/0122928 A1* | 5/2013 | Pfluger | 455/456.1 |
| 2014/0028456 A1* | 1/2014 | Sadhu | 340/539.13 |
| 2015/0089176 A1 | 3/2015 | Junkar et al. | |

OTHER PUBLICATIONS

Office Action received for Taiwanese Patent Application No. 102146394, mailed on Jan. 22, 2015, 9 pages including 4 pages of English translation.

Notice of Allowance received for Taiwanese Patent Application No. 102146394, mailed on Jun. 29, 2015, 2 pages.

International Preliminary Report on Patentability received for PCT Application No. PCT/CN2012/087817, mailed on Jul. 9, 2015.

* cited by examiner

GEOFENCING TECHNIQUES

RELATED APPLICATIONS

None.

BACKGROUND

The subject matter described herein relates generally to the field of electronic devices and more particularly to a system and method to implement geofencing techniques using electronic devices.

The term "geofencing" refers to techniques implemented in mobile computing devices in which virtual perimeters are superimposed on real geographic areas and alerts or activities may be triggered when a virtual perimeter is approached or crossed. Geofencing techniques may be used in combination with location-based services to offer services or alerts to a user of a mobile device. Accordingly systems and techniques to provide geofencing techniques may find utility.

BRIEF DESCRIPTION OF THE DRAWINGS

The detailed description is described with reference to the accompanying figures.

DETAILED DESCRIPTION

Described herein are exemplary systems and methods to implement geofencing techniques in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
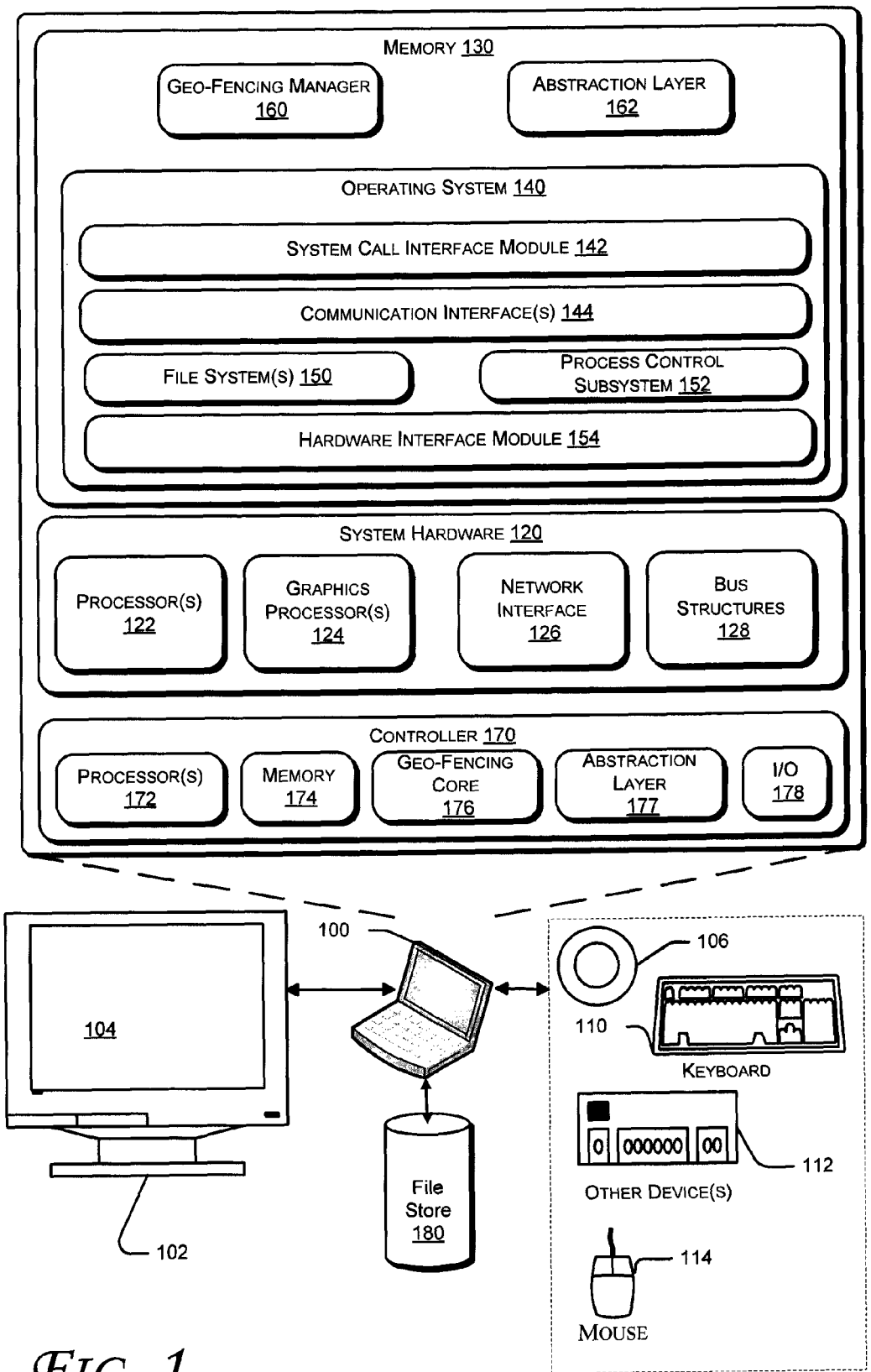
FIGS. 1-2 are schematic illustrations of exemplary electronic devices which may be adapted to implement geofencing techniques in accordance with some embodiments.

FIG. 1 is a schematic illustration of an electronic device 100 which may be adapted to implement geofencing techniques in accordance with some embodiments. In one embodiment, electronic device 100 includes one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, a geolocation device, an accelerometer/gyroscope and any other device that allows the electronic device 100 to receive input from a user.

In various embodiments, the electronic device 100 may be embodied as a personal computer, a laptop computer, a personal digital assistant, a mobile telephone, an entertainment device, or another computing device. The electronic device 100 includes system hardware 120 and memory 130, which may be implemented as random access memory and/or read-only memory. A file store 180 may be communicatively coupled to electronic device 100. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics processors 124, network interfaces 126, and bus structures 128. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 122 may be one or more processors in the family of Intel® Core2 Duo® processors available from Intel® Corporation of Santa Clara, Calif. Alternatively, other CPUs may be used, such as Intel's Itanium®, XEON™, ATOM™, and Celeron® processors.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on electronic device 100.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

Memory 130 may comprise one or more applications which execute on the processor(s) 122. The applications may be stored in permanent memory such as file store 180 when not in use by the electronic device 100. In use, the applications may be copied into memory 130 for execution. In the embodiment depicted in FIG. 1 the applications comprise a geofencing manager 160 and an abstraction layer 162.

In some embodiments electronic device 100 may comprise a low-power embedded processor, referred to herein as an adjunct controller 170. The adjunct controller 170 may be implemented as an independent integrated circuit located on the motherboard of the system 100. In the embodiment depicted in FIG. 1 the adjunct controller 170 comprises a processor 172, a memory module 174, a geofencing core 176, an abstraction layer 177, and an I/O module 178. In some embodiments the memory module 174 may comprise a persistent flash memory module and the authentication module 174 may be implemented as logic instructions encoded in the persistent memory module, e.g., firmware or software. The I/O module 178 may comprise a serial I/O module or a parallel I/O module. Because the adjunct controller 170 is physically separate from the main processor(s) 122 and operating system 140, the adjunct controller 170 may be made secure, i.e., inaccessible to hackers such that it cannot be tampered with.

Figure 2:
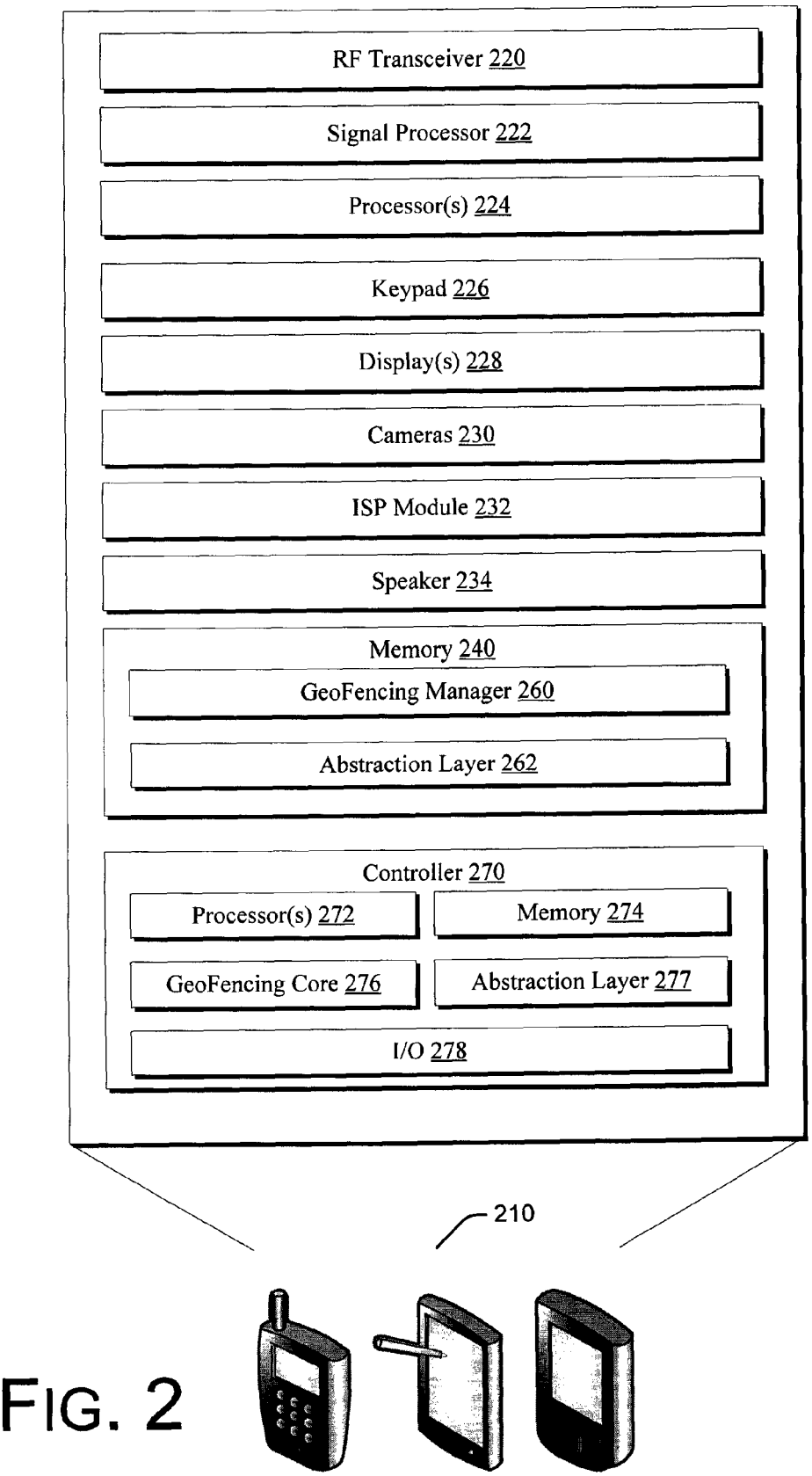

FIG. 2 is a schematic illustration of another embodiment of an electronic device 210 which may be adapted to implement geofencing techniques, according to embodiments. In some embodiments electronic device 210 may be embodied as a mobile telephone, a personal digital assistant (PDA), a laptop computer, or the like. Electronic device 210 may include an RF transceiver 220 to transceive RF signals and a signal processing module 222 to process signals received by RF transceiver 220.

RF transceiver 220 may implement a local wireless connection via a protocol such as, e.g., Bluetooth or 802.11x. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 210 may further include one or more processors 224 and a memory module 240. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 224 may be one or more processors in the family of Intel® PXA27x processors available from Intel® Corporation of Santa Clara, Calif. Alternatively, other CPUs may be used, such as Intel's Itanium®, XEON™, ATOM™, and Celeron® processors. Also, one or more processors from other manufactures may be utilized. Moreover, the processors may have a single or multi core design.

In some embodiments, memory module 240 includes random access memory (RAM); however, memory module 240 may be implemented using other memory types such as dynamic RAM (DRAM), synchronous DRAM (SDRAM), and the like. Memory 240 may comprise one or more applications which execute on the processor(s) 222. In the embodiment depicted in FIG. 2 the applications comprise a geofencing manager 260 and an abstraction layer 262.

Electronic device 210 may further include one or more input/output interfaces such as, e.g., a keypad 226 and one or more displays 228. In some embodiments electronic device 210 comprises one or more camera modules 230 and an image signal processor 232, and speakers 234.

In some embodiments electronic device 210 may include an adjunct controller 270 which may be implemented in a manner analogous to that of adjunct controller 170, described above. In the embodiment depicted in FIG. 2 the adjunct controller 270 comprises one or more processor(s) 272, a memory module 274, a geofencing core 276, an abstraction layer 277, and an I/O module 278. In some embodiments the memory module 274 may comprise a persistent flash memory module and the authentication module 276 may be implemented as logic instructions encoded in the persistent memory module, e.g., firmware or software. The I/O module 278 may comprise a serial I/O module or a parallel I/O module. Again, because the adjunct controller 270 is physically separate from the main processor(s) 224, the adjunct controller 270 may be made secure, i.e., inaccessible to hackers such that it cannot be tampered with.

Figure 3:
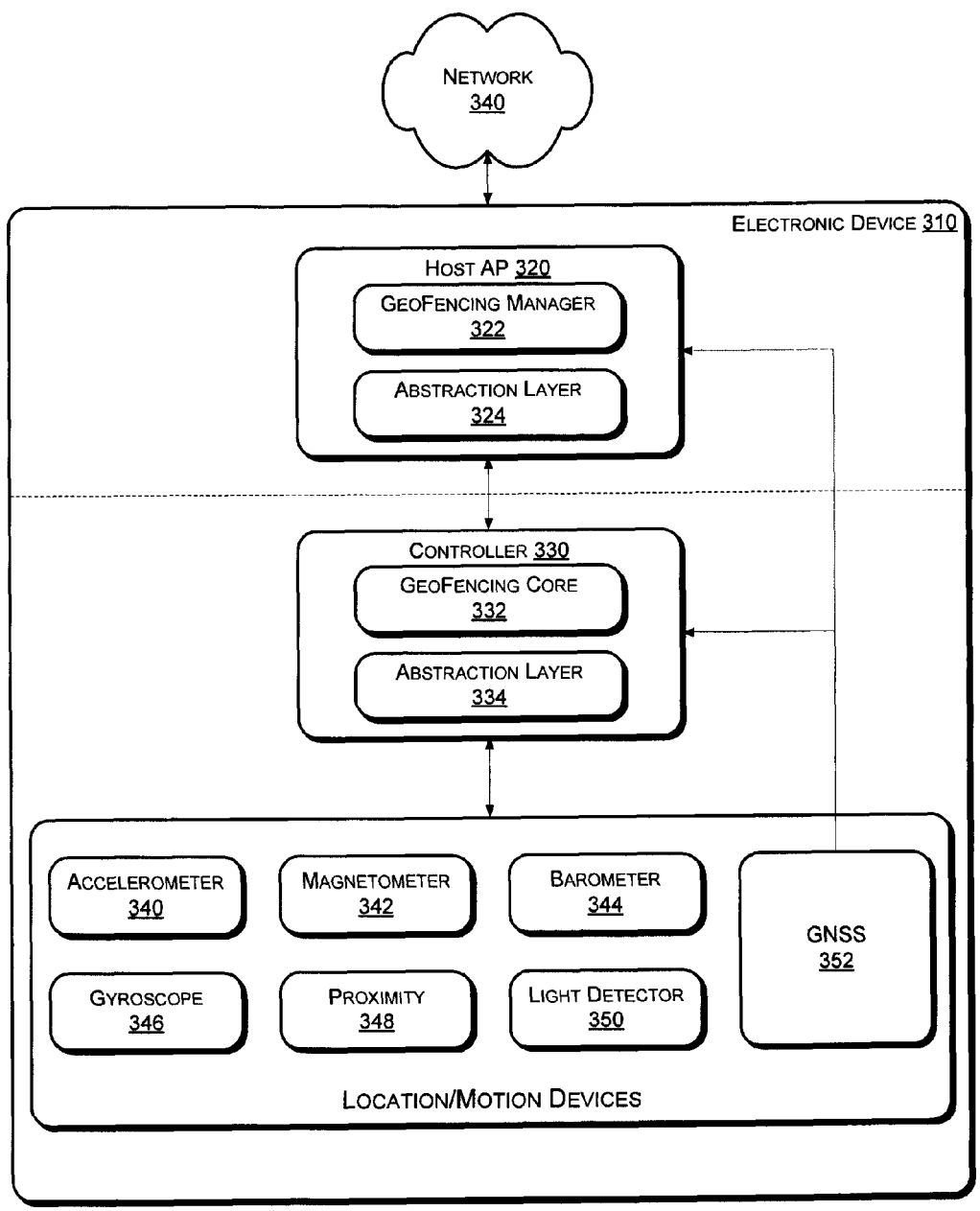
FIG. 3 is a high-level schematic illustration of an exemplary architecture for geofencing techniques in accordance with some embodiments.

In some embodiments the adjunct controller 170 depicted in FIG. 1 and the adjunct controller 270 depicted in FIG. 2 may cooperate with the respective processors 122, 222 to implement be geofencing techniques. More particularly in some embodiments the processors 122, 222 may offload portions of the geofencing techniques to the respective adjunct controllers 170, 270, thereby allowing the main processor(s) to remain in a sleep (or low power) state for longer periods of time. FIG. 3 is a high-level schematic illustration of an exemplary architecture for geofencing techniques in accordance with some embodiments. Referring to FIG. 3, a electronic device 310 may be characterized as having a host application processor 320 and a separate controller 330, which may be embodied as a low-power controller. When the electronic device 310 is embodied as a system 100 the host application processor 320 may be implemented by the processor(s) and operating system 140 of the system 100, while the controller 330 may be implemented by the controller 170. Similarly, when the electronic device 310 is embodied as an electronic device 210 the host application processor 320 may be implemented by the main processors(s) 224 of the electronic device 210 and the controller 330 may be implemented by the controller 270.

As illustrated in FIG. 3, host application processor 320 may comprise a geofencing manager 322 and an abstraction layer 324, while adjunct controller 330 comprises a geofencing core 332 and an abstraction layer 334. One or more location/motion devices may be coupled to the controller 330 to provide location and/or motion inputs to the controller 330. In some embodiments the location/motion devices may comprise an accelerometer 340, a magnetometer 342, a barometer 344, a gyroscope 346, a proximity detector 348, a light detector 350, or a global navigation satellite system (GNSS) receiver 352. In some embodiments the GNSS detector may also be coupled to the host processor 320.

While the various embodiments described herein illustrate the geofencing core residing in an adjunct controller, one skilled in the art will recognize that the geofencing core could reside in the main memory and execute on the main processor(s) of an electronic device. By way of example, the geofencing core 176 may reside in memory 130 and execute on processor(s) 122 of the electronic device 100 depicted in FIG. 1. Similarly, the geofencing core 276 may reside in the main memory 240 of the electronic device 200 depicted in FIG. 2.

Having described various structures of a system to implement trusted user input, operating aspects of a system will be explained with reference to FIG. 4, which is a flowchart illustrating operations in a method to implement geofencing techniques in accordance with some embodiments. In the embodiment depicted the operations depicted in the flowchart of FIG. 4 may be implemented by the geofencing manager 322 and the geofencing core 332 of the electronic device 310.

By way of overview, in some embodiments the geofencing manager 330 which executes on the host application processor 320 cooperates with the geofencing core(s) instantiated in the controller 330 to implement geofencing techniques. More particularly, the geofencing manager 322 may be configured to partition geofencing operations between the geofencing manager 322 and one or more the geofencing core(s) 332 executing on controller 330 in order to allow the host application processor 320 to remain in a sleep or low-power state for longer periods of time, thereby reducing power consumption by electronic device 310.

Figure 4:
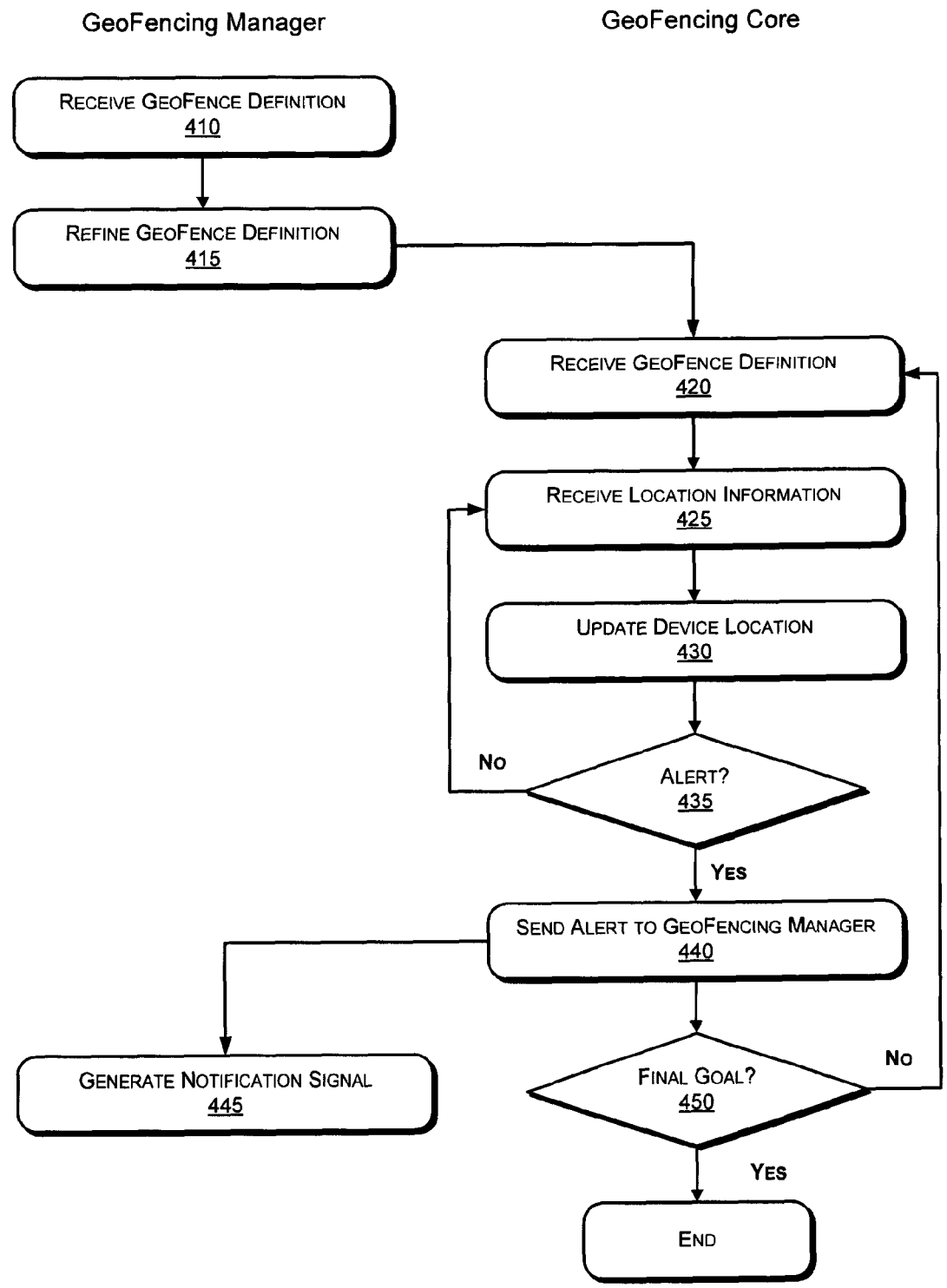
FIG. 4 is a flowchart illustrating operations in a method to implement geofencing techniques in accordance with some embodiments.

Referring to FIG. 4, in operation the geofencing manager 322 receives a geofence definition. By way of example, a geofence definition may be received from a user of electronic device 310 via an input interface or from an application executing on the electronic device 310 or a remote device coupled to electronic device 310. In some embodiments a geofence definition can be a point, or a line or boundary, or a geographical area in an arbitrary shape such circle, ellipsis, square, rectangle, arc, polygon, belt, or overlapped zones. The geographic area may be defined by latitude/longitude coordinates, global positioning system (GPS) coordinates or the like. A geofence definition may also include one or more alert conditions. By way of example, a geofence definition may include an alter condition which triggers an alert if the electronic device 310 comes within a predetermined distance of a specified location, crosses a specified boundary, or the like.

At operation 415 the geofencing manager may refine the geofence definition. By way of example, a geofence definition may be subdivided into multiple smaller geographic areas. The geofence definition may be passed from the geofencing manager 322 to the geofencing core(s) 332 executing on the controller 330, which receives the geofencing definition at operation 420. In some embodiments the geofencing manager 322 passes the geofence definition as it was received, while in some embodiments the geofencing manager passes only a portion of the geofence definition. By way of example, in embodiments in which a geofence definition which includes a geographic region is refined by subdividing the geographic region into multiple smaller regions, the geofencing manager 322 may pass a single sub-region to the geofencing core 332 at a time.

At operation 425 the geofencing core(s) 322 receive location information from one or more location/motion devices coupled to the controller 330. By way of example, in some embodiments the geofencing core 322 may subscribe for location updates from GNSS 352, or other location providers such as WiFi networks, cellular networks, and any other sensors such as accelerometer 340, a magnetometer 342, a barometer 344, a gyroscope 346, a proximity detector 348, a light detector 350.

At operation 430 the geofencing core(s) 322 update the device location based on the input(s) received in operation 430, and at operation 430 the geofencing core 322 determines whether one or more of the alert conditions in the geofence definition are met. In some embodiments the geofencing core(s) 322 implement a context-sensitive location update algorithm which updates location information based at least in part on update the location of the controller using an update frequency which is to vary as a function of the one or more location parameters. By way of example, in some embodiments the location update frequency may be based on a velocity measure, while in other embodiments the location update frequency may be based on proximity to a specific point of interest. In further embodiments the update frequency may vary as a function of a level of a charge level of a battery to be coupled to the controller. One example of an update frequency scheme is illustrated in Table I, below:

TABLE I

| Update Frequency | Level | Location Refresh Interval (min) | Context |
| --- | --- | --- | --- |
| Very High, Continuous Location | 1 | 1/60, 1/12 | Navigation during walking, no charging; In car navigation w/ charging. |
| High, "Nearly" Continuous Location | 2 | 1 | User is very close to the POI in geo-fencing case; In car geotrail recording in background. |
| Medium, Normal Location | 3 | 5 | Running or equivalent velocity |
| Low | 4 | 10 | Walking or equivalent velocity |
| Very Low | 5 | 30 | Used during nights, activity = sedentary or equivalent near zero velocity |
| Stop | 0 | Halt | When battery level is critical |

If, at operation 435, no alert conditions are met then control passes to operation 425 and the geofencing core 322 continues to monitor and update the device location. Thus, operations 425-435 define a loop by which the geofencing core(s) 322 monitor the device location against alert conditions established in the geofence definition.

By contrast, if at operation 435 an alert condition is triggered, then the geofencing core(s) 332 sends an alert to the geofencing manager 322. In some embodiments the geofencing manager 322 may generate (operation 445) and present a notification signal in response to the alert. By way of example, in some embodiments the geofencing manager 322 may generate and present a notification signal on a user interface of the electronic device 310.

If, at operation 450 the geofence definition indicates that a final goal has been reached then processing of the current geofence definition may be terminated. By contrast, if at operation 450 the geofence definition does not indicate that a final goal has been reached then control passes back to operation 420 and the geofence controller 332 waits to receive an additional geofence definition from the geofencing manager 322.

Thus, the operations depicted in FIG. 4 enable an electronic device to partition geofencing operations between a geofencing manager which executes on an application processor such as one of the processors 122, 222 depicted in FIG.

1 and FIG. 2, respectively, and a geofencing controller which executes on a low power processor such as one of the processors 172, 272 depicted in FIG. 1 and FIG. 2, respectively.

Figure 5:
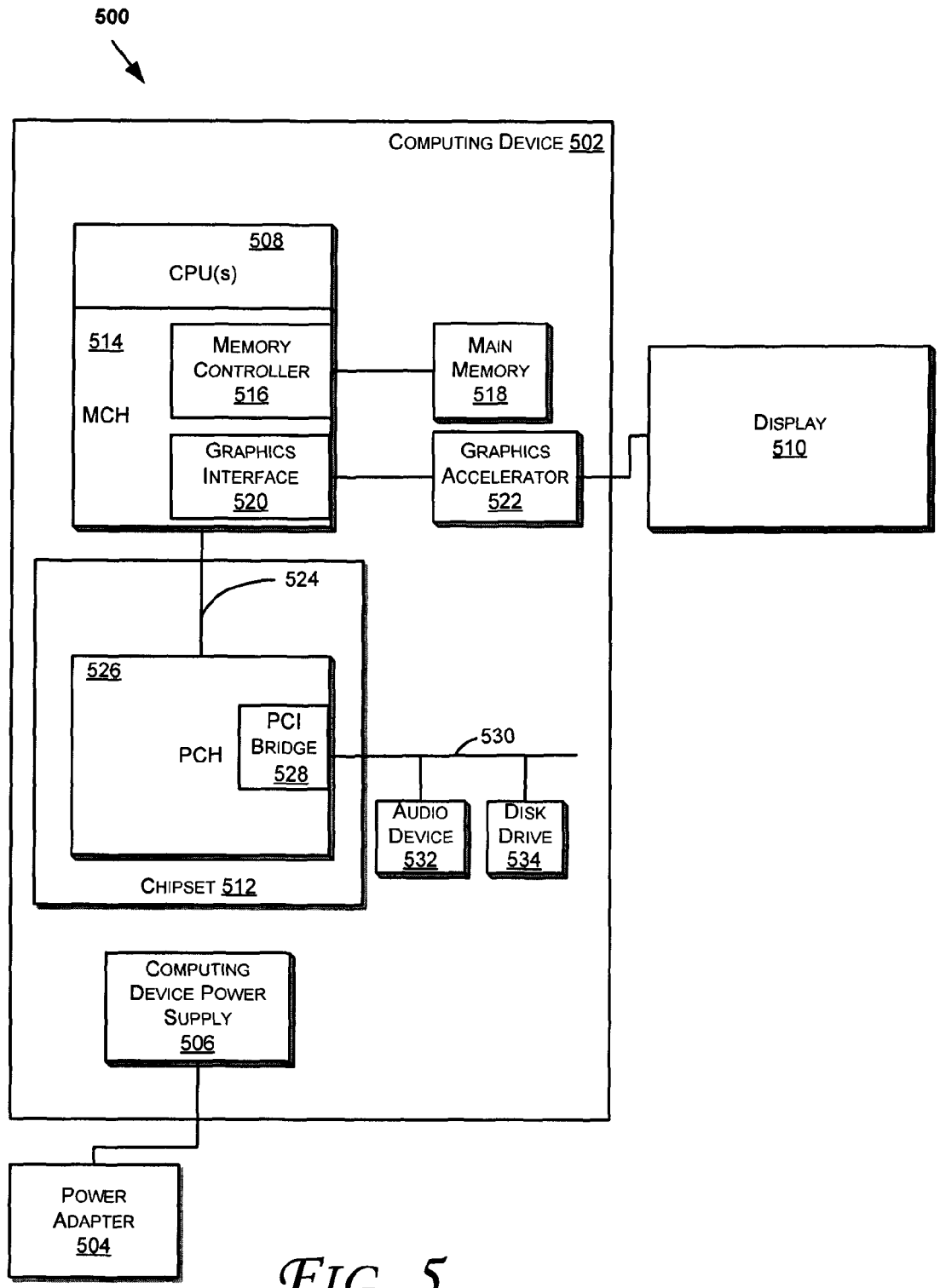
FIG. 5 is a schematic illustration of an electronic device which may be adapted to implement geofencing techniques in accordance with some embodiments.

As described above, in some embodiments the electronic device may be embodied as a computer system. FIG. 5 is a schematic illustration of a computer system 500 in accordance with some embodiments. The computer system 500 includes a computing device 502 and a power adapter 504 (e.g., to supply electrical power to the computing device 502). The computing device 502 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 502 (e.g., through a computing device power supply 506) from one or more of the following sources: one or more battery packs, an alternating current (AC) outlet (e.g., through a transformer and/or adaptor such as a power adapter 504), automotive power supplies, airplane power supplies, and the like. In some embodiments, the power adapter 504 may transform the power supply source output (e.g., the AC outlet voltage of about 110 VAC to 240 VAC) to a direct current (DC) voltage ranging between about 7 VDC to 12.6 VDC. Accordingly, the power adapter 504 may be an AC/DC adapter.

The computing device 502 may also include one or more central processing unit(s) (CPUs) 508. In some embodiments, the CPU 508 may be one or more processors in the Pentium® family of processors including the Pentium® II processor family, Pentium® III processors, Pentium® IV, CORE2 Duo processors, or Atom processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 512 may be coupled to, or integrated with, CPU 508. The chipset 512 may include a memory control hub (MCH) 514. The MCH 514 may include a memory controller 516 that is coupled to a main system memory 518. The main system memory 518 stores data and sequences of instructions that are executed by the CPU 508, or any other device included in the system 500. In some embodiments, the main system memory 518 includes random access memory (RAM); however, the main system memory 518 may be implemented using other memory types such as dynamic RAM (DRAM), synchronous DRAM (SDRAM), and the like. Additional devices may also be coupled to the bus 510, such as multiple CPUs and/or multiple system memories.

The MCH 514 may also include a graphics interface 520 coupled to a graphics accelerator 522. In some embodiments, the graphics interface 520 is coupled to the graphics accelerator 522 via an accelerated graphics port (AGP). In some embodiments, a display (such as a flat panel display) 540 may be coupled to the graphics interface 520 through, for example, a signal converter that translates a digital representation of an image stored in a storage device such as video memory or system memory into display signals that are interpreted and displayed by the display. The display 540 signals produced by the display device may pass through various control devices before being interpreted by and subsequently displayed on the display.

A hub interface 524 couples the MCH 514 to an platform control hub (PCH) 526. The PCH 526 provides an interface to input/output (I/O) devices coupled to the computer system 500. The PCH 526 may be coupled to a peripheral component interconnect (PCI) bus. Hence, the PCH 526 includes a PCI bridge 528 that provides an interface to a PCI bus 530. The PCI bridge 528 provides a data path between the CPU 508 and peripheral devices. Additionally, other types of I/O interconnect topologies may be utilized such as the PCI Express™ architecture, available through Intel® Corporation of Santa Clara, Calif.

The PCI bus 530 may be coupled to an audio device 532 and one or more disk drive(s) 534. Other devices may be coupled to the PCI bus 530. In addition, the CPU 508 and the MCH 514 may be combined to form a single chip. Furthermore, the graphics accelerator 522 may be included within the MCH 514 in other embodiments.

Additionally, other peripherals coupled to the PCH 526 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 502 may include volatile and/or nonvolatile memory.

Thus, there is described herein an architecture and associated methods to implement trusted user input in electronic devices. In some embodiments the architecture uses hardware capabilities embedded in an electronic device platform to provide assurances to a user that user input is being made in a secure and trusted environment. In the embodiments described herein secure input operations are based on processing that occurs within a trusted environment, separate from the host operating system. The execution environment may be implemented in a trusted execution complex which presents a secure dialog box that includes one or more anti-spoof indicators on a display to provide a user assurance that the input environment is secure. In some embodiments the trusted execution complex may be implemented in a remote device, e.g., a dongle.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller, comprising:
   logic, including hardware logic, configured to:
   receive, in the controller, a geofencing definition and input from at least one location information device;
   update a location of the controller using one or more location parameters from the at least one location information device and update frequency which is based on at least one of a velocity measure or a proximity to a specific point of interest;
   generate notification signal when the location of the controller indicates that the controller has determined an alert condition; and
   implement a context-based location updated routine, wherein the context-based location routine is to update the location of the controller using an update frequency which is to vary as a function of a level of a charge level of a battery which is capable of at least partially powering the contoller.

2. The controller of claim 1, wherein the logic is further configured to combine location information from a plurality of location information devices.

3. The controller of claim 1, wherein the context-based location routine is to update the location of the controller using an update frequency which is to vary as a function of the one or more location parameters.

4. The controller of claim 1, wherein the one or more location parameters comprises a velocity measure.

5. The controller of claim 1, wherein the logic is further configured to:
   provide the location of the controller to a processor separate from the controller.

6. An electronic device, comprising:
   a display;
   a processor; and
   a controller comprising logic, at least partially including hardware logic, configured to:
   receive, in the controller, a geofencing definition and input from at least one location information device;
   update a location of the controller using one or more location parameters from the at least one location information device and update frequency which is based on at least one of a velocity measure or a proximity to a specific point of interest;
   generate a notification signal when the location of the controller indicates that the controller has determined an alert condition; and
   implement a context-based location update routine, wherein the context-based location routine is to update the location of the controller using an update frequency which is to vary as a function of a level of a charge level of a battery which is capable of at least partially powering the controller.

7. The electronic device of claim 6, wherein the logic is further configured to combine location information from a plurality of location information devices.

8. The electronic device of claim 6, wherein the context-based location routine is to update the location of the controller using an update frequency which is to vary as a function of the one or more location parameters.

9. The electronic device of claim 6, wherein the one or more location parameters comprises a velocity measure.

10. The electronic device of claim 6, wherein the logic is further configured to:
    provide the location of the controller to a processor separate from the controller.

11. A computer program product comprising logic instructions stored on a tangible computer readable medium which, when executed by a controller, configure the controller to:
    receive, in the controller, a geofencing definition and input from at least one location information device;
    update a location of the controller using one or more location parameters from the at least one location information device and update frequency which is based on at least one of a velocity measure or a proximity to a specific point of interest;
    generate a notification signal when the location of the controller indicates that the controller has crossed a threshold; and
    implement a context-based location update routing, wherein the context-based location routine is to update the location of the controller using an update frequency which is to vary as a function of a level of a charge level of a battery which is capable of at least partially powering the controller.

12. The computer program product of claim 11, further comprising logic instructions stored on a tangible computer readable medium which, when executed by a controller, configure the controller to combine location information from a plurality of location information devices.

13. The computer program product of claim 11, wherein the context-based location routine is to update the location of the controller using an update frequency which is to vary as a function of the one or more location parameters.

14. The computer program product of claim 11, wherein the one or more location parameters comprises a velocity measure.

15. The computer program product of claim 11, further comprising logic instructions stored on a tangible computer readable medium which, when executed by a controller, configure the controller to:
provide the location of the controller to a processor separate from the controller.

16. A method, comprising:
receiving, in a controller, a geofencing definition and input from at least one location information device;
updating a location of the controller using one or more location parameters from the at least one location information device and at an update frequency which is based on at least one of a velocity measure or a proximity to a specific point of interest;
generating a notification signal when the location of the controller indicates that the controller has determined an alert condition; and
implementing a context-based location update routine, wherein the context-based location routine is to update the location of the controller using an update frequency which is to vary as a function of a level of a charge level of a battery which is capable of at least partially powering the controller.

17. The method of claim 16, further comprising combining location information from a plurality of location information devices.

18. The method of claim 16, wherein the context-based location routine is to update the location of the controller using an update frequency which is to vary as a function of the one or more location parameters.

* * * * *